Figure 1:
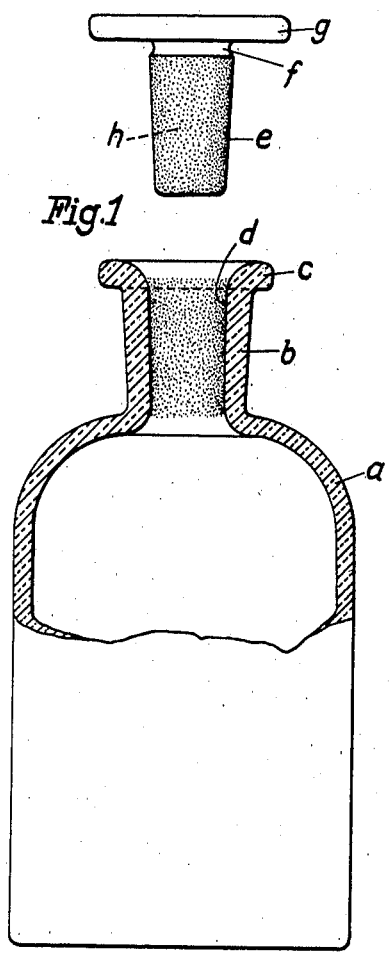

Aug. 6, 1935.  A. FEHSE  2,010,257
PROCESS FOR PRODUCING THE FITTING SURFACES INVOLVED IN THE
CASE OF GLASS BOTTLE NECKS FITTED WITH GLASS STOPPERS
Filed Sept. 1, 1933  2 Sheets-Sheet 1

Inventor:
Adolf Fehse,
by Hauks. Addleman
Atty.

Aug. 6, 1935.  A. FEHSE  2,010,257
PROCESS FOR PRODUCING THE FITTING SURFACES INVOLVED IN THE
CASE OF GLASS BOTTLE NECKS FITTED WITH GLASS STOPPERS
Filed Sept. 1, 1933  2 Sheets-Sheet 2
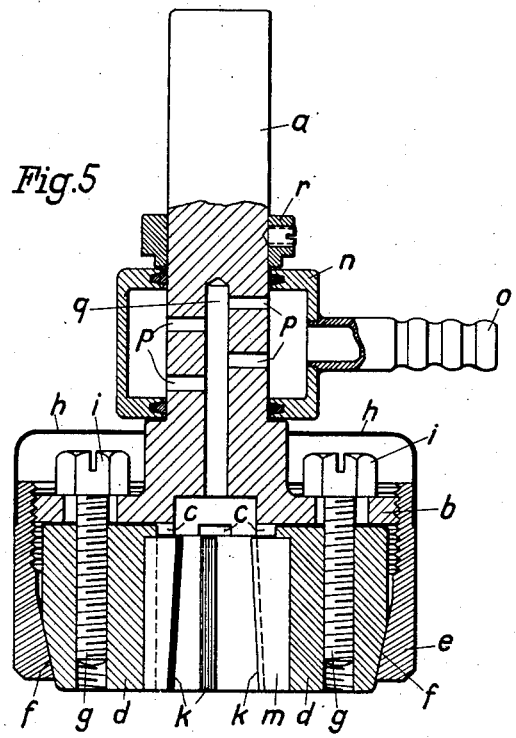
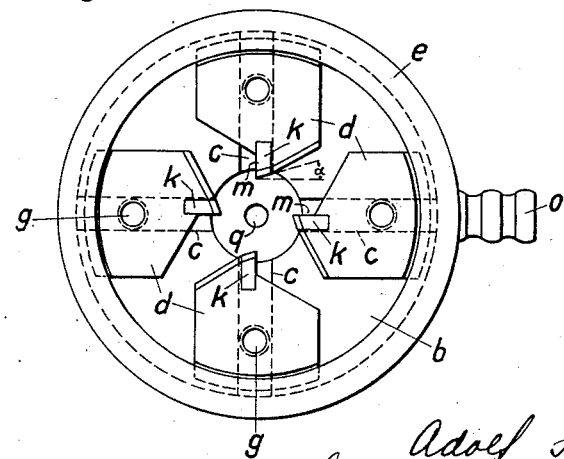
Inventor:
Adolf Fehse, Patented Aug. 6, 1935

2,010,257

UNITED STATES PATENT OFFICE 2,010,257

PROCESS FOR PRODUCING THE FITTING SURFACES INVOLVED IN THE CASE OF GLASS BOTTLE NECKS FITTED WITH GLASS STOPPERS

Adolf Fehse, Berlin, Germany, assignor to Vereinigte Lausitzer Glaswerke Aktiengesellschaft, Berlin, Germany, a corporation of Germany Application September 1, 1933, Serial No. 687,920
In Germany November 21, 1932

1 Claim. (Cl. 49—77)

The invention relates to the production of the fitting surface involved in the case of glass bottle necks having glass stoppers. In the case of these glass bottles provided with glass stoppers to be inserted gastight into the bottle neck which have hitherto been in use, there is present the defect that in one and the same type of bottle the internal diameter of the bottle neck and the diameter of the stopper prove different and that only one quite definite stopper fits each marketable bottle. Consequently it has hitherto been necessary when despatching the bottles to take care, for example, by binding to the bottles the individual stoppers which have been manufactured to fit exactly, that no interchanging of the stoppers occurs, since otherwise the sale and the possibility of using the bottles is placed in question. The despatch, the sale, the storing and finally the possibility of using such bottles are on this account naturally rendered considerably difficult.

These difficulties as they occur in the case of the well known glass bottles provided with glass stoppers closing in a gas-tight manner are according to the invention avoided in a simple manner by those faces of the stopper and bottle neck which come into contact with one another being subjected to treatment by a tool which removes chips. As a result of this process the fitting seating determined by the tightly fitting surfaces of the bottle neck and of the glass stopper is formed differently from that in the case of those glass bottles provided with glass stoppers which have been hitherto in use. According to the invention both the glass bottle and its glass stopper are provided with turned or milled fitting surfaces. The glass bottle and its stopper are thus made to dimensions kept within limits never hitherto attained, which permits the stoppers produced in one and the same issue to be employed as desired with bottles produced in the same issue. When the glass bottles and glass stoppers are thus formed the fitting surfaces may also readily be made with a conicity which especially promotes the insertion and removal of the stoppers. The structure of the roughenings of the fitting surfaces of glass bottles and stoppers made according to the invention is moreover essentially different from the structure of the roughenings hitherto produced by grinding with sand-powder. Since according to the invention the fitting surfaces of the necks of all bottles of the same type are produced with one and the same turning tool which guarantees a constant diameter and the same also holds good for all glass stoppers of the same type of bottle, it is now possible to store the glass bottles and glass stoppers separately and to co-ordinate to each bottle of one type any glass stopper whatever, from the warehouse store, belonging to said type of bottle.

It has proved to be advantageous to effect according to the invention the treatment of the fitting surface of the bottle neck and the glass stopper, by which chips are removed, with the aid of hard metal cutters having a free-angle between 15° and 30°, whereas in the machining of metal hitherto for milling and turning smaller free-angles than 15° have been provided for the cutters. As has been found to be the case, while adhering to such a free-angle, the turning and milling of glass members can be performed with very few breakages and very economically, the glass members being at the same time made to the desired dimensions within the smallest limits. For the treatment of the glass stoppers there is employed a milling cutter provided with radially adjustable hard metal cutters having a free-angle lying between 15° and 30° and for the turning of the internal face of the bottle neck a reamer provided with inserted hard metal cutters having the same free-angle.

In order to reduce still more the breakage of the glass members a cooling medium may according to the invention be supplied to the milling cutter and to the reamer during the process removing the chips. For this purpose there may be provided on the milling cutter spindle a water chamber which does not participate in the rotation of the milling cutter head, which through suitable bores in the milling cutter continuously conducts cooling liquid, for example, water, into the space which remains in the milling cutter between the cutter cheeks carrying the hard metal cutters. In the case of the reamer for the purpose of cooling the work-surfaces several radial bores opening between the hard metal cutters may be arranged for conducting water.

Figure 3:
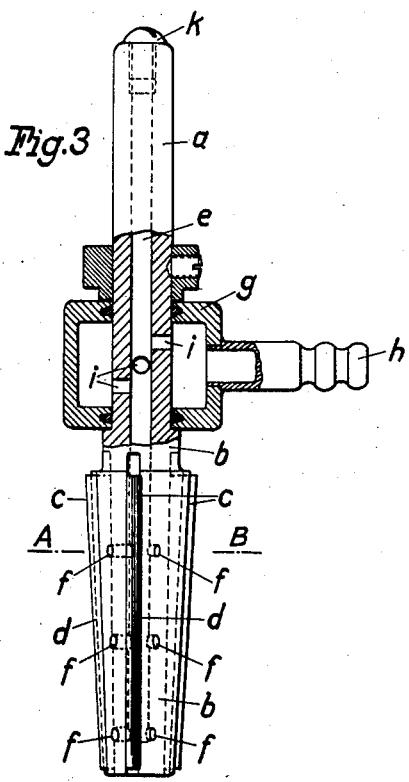
Figure 2:
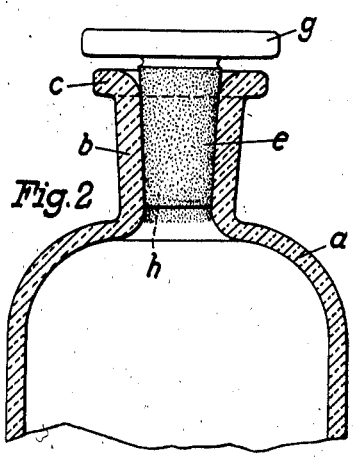

The drawings illustrate in Figs. 1 and 2 a constructional example of a glass bottle provided with a glass stopper in the case of which the fitting surfaces of the bottle neck and stopper are machined and obtained by the process according to the invention. Fig. 1 presents a section through the bottle and stopper and Fig. 2 represents a corresponding section after the insertion of the glass stopper. Fig. 3 illustrates in part sectional elevation and Fig. 4 in section on the line A—B of Fig. 3 one constructional example of a reamer constructed and to be employed according to the invention. Figs. 5 and 6 show in longitudinal section and in under-plan a constructional example of a milling cutter according to the invention.

According to Figs. 1 and 2 the bottle $a$ possesses in a well known manner a cylindrical or approximately cylindrical neck $b$ with a projecting edge $c$. The conical internal fitting surface $d$ is roughened by being turned by a tool which removes chips, a conical reamer fitted with hard metal cutters being suitably employed. The glass stopper possesses in a well known manner a conical part $e$, between which and the disc-shaped handle portion $g$ there is an annular groove $f$. The fitting surface $h$ of the glass stopper is roughened like the bottle neck, likewise produced with the aid of a tool which removes chips and in this case also suitably with the aid of a milling cutter provided with hard metal cutters. The roughenings of the stoppering surfaces $d$ and $h$ are indeed somewhat coarser than the roughenings produced hitherto by the action of sand, but nevertheless ensure, as has been found to be the case, an effective gas-tight closure. The bottles, their necks and consequently also the conical turned out portions of the latter and likewise also the glass stoppers may be of many different shapes. The annular groove on the glass stopper may if desired be dispensed with.

Figure 4:
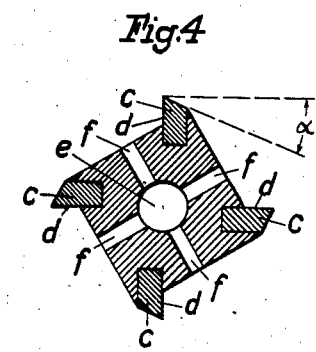

In order to turn the internal surface of the neck of the bottle shown in Figs. 1 and 2 the conical reamer shown in Figs. 3 and 4 is suitably employed. This reamer possesses a cylindrical spindle $a$, which merges into a slightly enlarged head $b$ of the shape of a slim truncated pyramid. In this head portion $b$ there are inserted four cutters $c$ of hard metal, which may consist of sintered wolfram carbide with an admixture of readily fusible metals. The four cutters are so inserted that their front surfaces $d$ are radial to the axis of the head portion $b$. The free-angle $x$ of each cutter amounts to 15°–30°. Through the greater part of the length of the reamer there extends a central bore $e$, from which extend several sets of radial bores $f$, which open between the cutters $c$. The spindle $a$ is surrounded close above the head $b$ by a water chamber $g$ provided with a connecting union $h$, which chamber does not participate in the rotation of the reamer. The chamber $g$ is connected by means of transverse bores $i$ in the shaft $a$ with the central bore $e$ which is closed at its upper end by means of a screw $k$, so that during the working operation cooling water may continually be conducted from the chamber $g$ through the bores $i$, $e$, $f$ to the working surfaces.

The number of the cutters of hard metal inserted in the head portion $b$ is optional. The spindle portion may also have a different shape as desired. The conicity of the inserted cutters depends on the shape of the surfaces at the time to be produced on the glass member.

The milling cutter represented in Figs. 5 and 6 proves to be advantageous for the milling of the conical glass stopper of the bottle shown in Figs. 1 and 2. This milling cutter consists of a cylindrical spindle $a$, which at the lower end merges into a circular supporting plate $b$. The latter possesses four grooves $c$ arranged cross-wise and radially, in which grooves four cheeks $d$ are guided radially. The cheeks $d$ and also the disc $b$ are surrounded by a ring $e$ which is screwed on and which possesses a conical internal face $f$ with which it rests against corresponding conical external faces on the cheeks $d$. Perpendicular screw-threaded bolts $g$ serve for the attachment of cheeks $d$, said bolts engaging through slots $h$ in the disc $b$ and being able to be fixed by tightening their heads $i$. In those surfaces of the four cheeks which are turned towards one another cutters $k$ of hard metal are inserted, which metal may consist of sintered wolfram carbide with an admixture of readily fusible metal. The four cutters are so inserted in the cheeks that their front surfaces $m$ are radial to the axis of the milling cutter or of the spindle $a$ and to the axis of the disc $b$. The free angle $x$ of each cutter amounts to 15° to 30°.

The spindle $a$ is surrounded by a water chamber $n$, which does not participate in the rotation and to which water is continuously supplied through a connecting union $d$ during the milling operation. The water chamber $n$ is connected through transverse bores $p$ provided in the spindle $a$ with a longitudinal bore $q$ in the spindle, which longitudinal bore opens axially in the disc $b$ and consequently conducts the cooling water into the space between the cheeks and the cutters. In order to keep the cooling chamber in position on the shaft an additional collar $r$ capable of being firmly secured is provided.

The cheeks fitted with the hard metal cutters may conveniently be suited to the size of the conical glass stopper to be milled. For this purpose it is only necessary to slacken the screw-heads $i$. Then by suitably turning the ring $e$ the cheeks can either be made to move radially inwards or slightly to move apart radially. Before performing the milling operation a standard cone is pushed into the space in the milling cutter head while the screw-heads $i$ are loosened, whereupon the cheeks are then set by suitably turning the ring $e$ and then finally the screw-heads $i$ are tightened up firmly.

The number of the cheeks inserted in the milling cutter head and of the metal cutters is as desired. The spindle portion and the water chamber upon it may also have a different shape. If desired the cooling of the working surfaces may also be effected in a different way. The conicity of the cutters which are inserted depends on the shape of the conical member to be milled at the time.

Having now particularly described and ascertained the nature of my said invention and in what manner the same is to be performed, I declare that what I claim is:—

A method for producing the fitting surfaces involved in the case of glass stoppers to be fitted tightly into the necks of glass bottles consisting in submitting these surfaces to a chips removing operation by means of hard metal cutters.

ADOLF FEHSE.